United States Patent
Koivisto

(10) Patent No.: US 11,474,804 B2
(45) Date of Patent: Oct. 18, 2022

(54) DEVICE MANAGEMENT SYSTEM

(71) Applicant: Kone Corporation, Helsinki (FI)

(72) Inventor: Ari Koivisto, Helsinki (FI)

(73) Assignee: Kone Corporation, Helsinki (FI)

( * ) Notice: Subject to any disclaimer, the term of this patent is extended or adjusted under 35 U.S.C. 154(b) by 34 days.

(21) Appl. No.: 16/733,434

(22) Filed: Jan. 3, 2020

(65) Prior Publication Data

US 2020/0142687 A1 May 7, 2020

Related U.S. Application Data

(63) Continuation of application No. PCT/EP2018/070864, filed on Aug. 1, 2018.

(30) Foreign Application Priority Data

Aug. 11, 2017 (EP) ..................................... 17185854

(51) Int. Cl.
*G06F 15/16* (2006.01)
*G06F 8/65* (2018.01)
(Continued)

(52) U.S. Cl.
CPC ............ *G06F 8/65* (2013.01); *H04L 41/0213* (2013.01); *H04L 41/0654* (2013.01); *H04L 41/082* (2013.01); *H04L 41/0853* (2013.01)

(58) Field of Classification Search
CPC ..... G06F 8/65; H04L 41/0213; H04L 41/044; H04L 41/0654; H04L 41/082; H04L 41/0853

(Continued)

(56) References Cited

U.S. PATENT DOCUMENTS 6,085,243 A * 7/2000 Fletcher .............. H04L 41/5009
709/224
8,553,561 B1 * 10/2013 Chokshi ................ H04L 45/122
370/395.42

(Continued)

FOREIGN PATENT DOCUMENTS

JP 2009-215001 A 9/2009
JP 2010-180004 A 8/2010

OTHER PUBLICATIONS

International Search Report PCT/ISA/210 for International Application No. PCT/EP2018/070864 dated Sep. 24, 2018.

(Continued)

*Primary Examiner* — Nicholas R Taylor
*Assistant Examiner* — Thorne E Waugh
(74) *Attorney, Agent, or Firm* — Harness, Dickey & Pierce, P.L.C.

(57) ABSTRACT

A method including receiving, from a device management element or function of at least one transport and/or access device or function installed at a predefined location for which a local control is to be conducted, and storing device or function related data, forwarding the stored device or function related data to a centralized control element or function, receiving, from the centralized control element or function, and processing instruction data for the at least one transport and/or access device or function, and conducting a local device or function management control procedure for the at least one transport and/or access device or function according to a result of the processing of the instruction data.

13 Claims, 6 Drawing Sheets

(51) Int. Cl.
*H04L 41/0213* (2022.01)
*H04L 41/0654* (2022.01)
*H04L 41/082* (2022.01)
*H04L 41/0853* (2022.01)

(58) Field of Classification Search
USPC ............................................ 717/168
See application file for complete search history.

(56) References Cited

U.S. PATENT DOCUMENTS

| | | | | |
|---|---|---|---|---|
| 8,665,841 | B1* | 3/2014 | Goel | H04L 45/26 370/327 |
| 9,021,462 | B2* | 4/2015 | Gupta | G05B 15/02 717/172 |
| 9,681,161 | B2* | 6/2017 | Gonder | H04N 21/643 |
| 9,743,376 | B2* | 8/2017 | Paek | H04W 4/02 |
| 9,817,947 | B2* | 11/2017 | Hermans | G16H 40/20 |
| 9,900,820 | B2* | 2/2018 | Gao | H04W 36/0069 |
| 9,923,918 | B2* | 3/2018 | Nicodemus | H04L 63/1416 |
| 10,194,273 | B2* | 1/2019 | Xie | H04W 4/026 |
| 10,248,996 | B2* | 4/2019 | Raleigh | G06Q 40/025 |
| 10,270,727 | B2* | 4/2019 | Philipson | H04W 4/029 |
| 10,270,899 | B1* | 4/2019 | Merjanian | H04W 4/14 |
| 10,630,501 | B2* | 4/2020 | Ansari | H04W 12/033 |
| 2010/0255883 | A1* | 10/2010 | Takahashi | H04M 1/72406 455/566 |
| 2011/0289199 | A1* | 11/2011 | Kuo | H04N 21/85406 709/221 |
| 2012/0166538 | A1 | 6/2012 | Son et al. | |
| 2014/0282458 | A1* | 9/2014 | Gupta | G05B 15/02 717/168 |
| 2017/0144858 | A1 | 5/2017 | Gandhi et al. | |
| 2018/0069668 | A1* | 3/2018 | Jorgensen | H04W 28/20 |
| 2018/0081670 | A1* | 3/2018 | Caushi | G07C 5/00 |
| 2018/0191720 | A1* | 7/2018 | Dawes | H04L 12/2803 |

OTHER PUBLICATIONS

Written Opinion of the International Searching Authority PCT/ISA/237 for International Application No. PCT/EP2018/070864 dated Sep. 24, 2018.

Communication of a notice of opposition dated Nov. 25, 2020 for European Patent Application No. 17185854.1.

* cited by examiner

DEVICE MANAGEMENT SYSTEM

CROSS-REFERENCE TO RELATED APPLICATION

This application is a continuation of PCT International Application No. PCT/EP2018/070864 which has an International filing date of Aug. 1, 2018, and which claims priority to European patent application number 17185854.1 filed Aug. 11, 2017, the entire contents of both of which are incorporated herein by reference.

DESCRIPTION

Background

Field

The present invention relates to devices, methods, systems, and computer program products usable for managing devices and/or functions at a predetermined location, such as a building or the like.

Background Art

The following description of background art and examples may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
  CCU: central control unit/function
  DMA: device management agent
  DMS: device management device/function on site
  LMT: local maintenance terminal Device management systems are used to manage, either on site or via a remote server a plurality of devices installed, for example, in a building. Typically, a device management system is a computer-based control system for controlling various devices installed in buildings by controlling and monitoring mechanical and electrical equipment such as lighting, security system, fire systems, devices used for transporting persons in or to the building and devices providing access to the building.

A typical architecture under which existing device management systems operate is a so-called star architecture where each device is connected to a central control unit or system which is located e.g. in a computer cloud environment or on a remote server, which are commonly referred to in the following as a central control unit or function CCU. The CCU is connected to the devices installed in the building and manages them directly.

However, in such a star architecture, the functionality and performance of the device management system relies to a great extent on connectivity quality and conditions of a connection between the remote CCU and the respective devices, such as for example telecommunication connections or the like involving Internet based links or the like. All operations related to the devices, even those happening on site, have to go via the cloud or the remote server. Transactional operations involving e.g. a large amount of data, such as update procedures or the like, are in addition very vulnerable to network outages, as the connectivity from the site to the cloud environment is not necessarily very reliable to each time. For example, when an updating process for devices located on a site is executed and an interruption of the connection occurs, i.e. the connectivity is lost, a situation may occur where it is unknown on the CCU side which progress the update process has been made, i.e. whether it is interrupted or completed, which devices are updated or not, whether all devices are still operational etc. That is, it is only known what data (e.g. updated version of an operating system, configuration data or the like) have been delivered from the CCU, but it is not known which sort of changes have been made at the devices on site.

In case the connectivity is lost for e.g. a longer period of time, there is no way for the remote CCU (i.e. cloud) to fix problems caused by the unstable situation on site. That is, even in case the current situation is deduced on the CCU side, the details on the site, e.g. a partial breakage of some of the devices due to the incomplete update or the like, or a failure in cooperation between devices or functions thereof due to an incomplete update leading to an incompatibility between software versions running on respective devices on site, remain unknown. Hence, in such a case, a visit of the site by service personal may be the required measure, which is costly and time-consuming.

Hence, it is desirable to provide a device management system where problems caused by an unreliable communication connection between the devices located on site (i.e. at the building) and a remote CCU (e.g. located in a cloud environment connected by telecommunication links) do not make it necessary that service personal has to visit the site, and that the functionality and performance of devices on site is kept so that operation interruption and operation safety is maintained. Furthermore, it is desirable to provide a device management system in which information about what settings and software are actually used at the devices on site is available at the CCU side, and where an updating process of such data or settings can be reliable executed from the remote CCU.

SUMMARY

This objects are achieved by a management control method according to claim 1, a management control device according to claim 8 and a management control system according to claim 9. Advantageous further developments are as set forth in the dependent claims.

According to an example of an embodiment, there is provided, for example, a method including receiving, from a device management element or function of at least one transport and/or access device or function installed at a predefined location for which a local control is to be conducted, and storing device or function related data, forwarding the stored device or function related data to a centralized control element or function, receiving, from the centralized control element or function, and processing instruction data for the at least one transport and/or access device or function, and conducting a local device or function management control procedure for the at least one transport and/or access device or function according to a result of the processing of the instruction data.

Furthermore, according to an example of an embodiment, there is provided, for example, a local device or function management control device including means for receiving, from a device management element or function of at least one transport and/or access device or function installed at a predefined location for which a local control is to be conducted, and storing device or function related data, means for forwarding the stored device or function related data to a centralized control element or function, means for receiving, from the centralized control element or function, and processing instruction data for the at least one transport and/or access device or function, and means for conducting a local device or function management control procedure for the at least one transport and/or access device or function according to a result of the processing of the instruction data.

Furthermore, according to an example of an embodiment, there is provided, for example, a system for conducting a management control of at least one local device or function, including at least one transport and/or access device or function installed at a predefined location for which a local control is to be conducted, at least one device management element or function connected to each of the of at least one transport and/or access device or function, at least one local device or function management control device to which the at least one device management element or function is connected, and a centralized control element or function connected to the at least one local device or function management control device, wherein each of the at least one local device or function management control device receives from the connected at least one device management element or function device or function related data and stores the received device or function related data, each of the at least one local device or function management control device forwards the stored device or function related data to the centralized control element or function, the centralized control element or function sends instruction data for the at least one transport and/or access device or function to the at least one local device or function management control device, and the at least one local device or function management control device conducts a local device or function management control procedure for the at least one transport and/or access device or function according to a result of the processing of the instruction data.

According to further refinements, these examples may include one or more of the following features:

- the at least one transport and/or access device or function may include at least one of a device usable for transporting at least one person, wherein the device usable for transporting the at least one person includes at least one of an elevator device, an escalator device, a moving walk device, a ramp, a device usable for providing access for at least one person, wherein the device usable for providing access for the at least one person includes a door device installed in a building representing the predefined location, an access gate device installed in a building representing the predefined location, a device or function usable for informing or guiding at least one person in the predefined location, wherein the device or function usable for informing or guiding the at least one person in the predefined location includes a guidance or signage system, an indoor navigation system, an access control system, a transport and/or access device control system, and the device or function related data may comprise at least one of information indicating a software version of the transport and/or access device or function, information indicating a hardware version of the transport and/or access device or function, identification information of the transport and/or access device or function, configuration setting information of the transport and/or access device or function, and status information of the transport and/or access device or function;
- the instruction data may be received from the centralized control element or function by using a signaling link via a communication network, or by locally connecting a maintenance unit and transferring the instruction data from the maintenance unit;
- the instruction data may comprise at least one of a command concerning one transport and/or access device or function or a group comprising a plurality of transport and/or access devices or functions installed in the predefined location, a sequence of commands concerning one transport and/or access device or function or a group comprising a plurality of transport and/or access devices or functions installed in the predefined location, and configuration data concerning one transport and/or access device or function or a group comprising a plurality of transport and/or access devices or functions installed in the predefined location;
- the local device or function management control procedure for the at least one transport and/or access device or function according to the result of the processing of the instruction data may include executing an updating process of data installed in or of a configuration setting of the at least one transport and/or access device or function, determining whether a failure in the updating process occurred, and if a failure is determined restoring the data or the configuration setting into a state before executing the updating process;
- the local device or function management control procedure for the at least one transport and/or access device or function according to the result of the processing of the instruction data may include executing an updating process of data installed in or of a configuration setting of a plurality of transport and/or access devices or functions being allocated to one group, determining whether a failure in the updating process occurred in at least one of the plurality of transport and/or access devices or functions being allocated to the one group, and if a failure is determined restoring the data or the configuration setting into a state before executing the updating process for the each of the plurality of transport and/or access devices or functions allocated to the one group;
- the local device or function management control procedure for the at least one transport and/or access device or function according to the result of the processing of the instruction data may include receiving and storing at least one of data to be installed in and a configuration setting of at least one transport and/or access device or function, identifying the at least one transport and/or access device or function as being connected, and executing an installation process of at least one of the data to be installed in and the configuration setting of the identified transport and/or access device or function.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
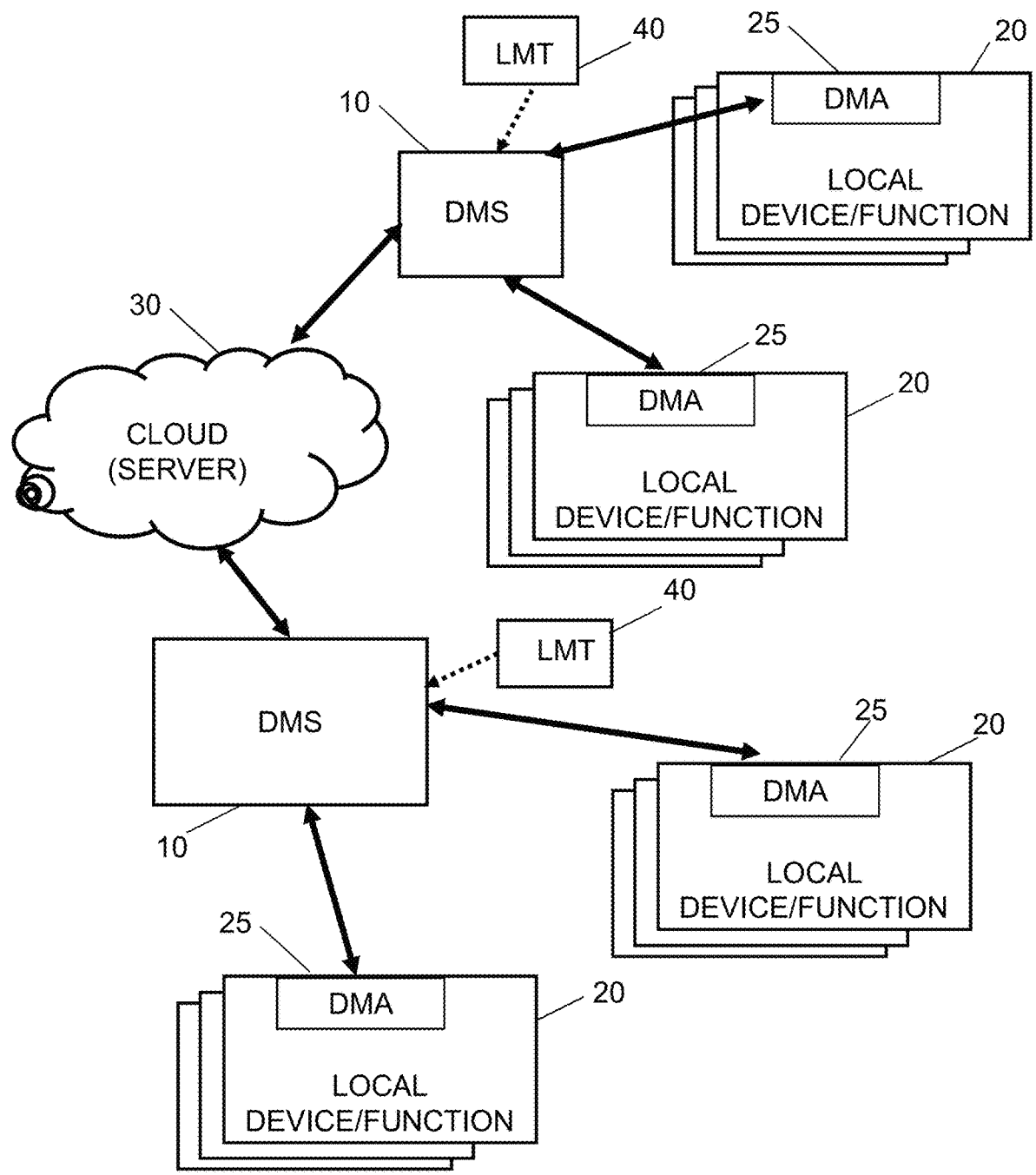
FIG. 1 shows a schematic diagram illustrating a configuration of a device management system according to some examples of embodiments.

In the following, different exemplifying embodiments will be described using, as an example of a device or function management system to which the embodiments may be applied, a device or function management system as depicted and explained in connection with FIG. 1. However, it is obvious for a person skilled in the art that principles of embodiments may also be applied to other kinds of a device or function management systems having different types of configurations. That is, examples of embodiments of the invention are applicable to a wide range of different kinds of a device or function management systems.

It is to be noted that the following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

The general elements and functions of described a device or function management systems, details of which also depend on the actual type of a device or function management system, are known to those skilled in the art, so that a detailed description thereof is omitted herein. However, it is to be noted that several additional devices and functions besides those described below in further detail may be employed in device or function management system.

Furthermore, elements or parts of a device or function management system, in particular device management elements, such as a LMA, local device or function management control devices, such as a DMS, centralized control elements, such as a CCU, as well as corresponding functions as described herein, and other elements, functions or applications may be implemented by using software, e.g. by a computer program product for a computer, and/or by hardware. For executing their respective functions, correspondingly used devices, elements or functions may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means etc.) and the like. It is to be noted that in the present specification processing portions should not be only considered to represent physical portions of one or more processors, but may also be considered as a logical division of the referred processing tasks performed by one or more processors.

A general configuration of a device management system according to examples of embodiments of the invention is based on a star of stars configuration. That is, instead of connecting the CCU or cloud to each of a plurality of devices for controlling the device and/or functions and/or subcomponents thereof, the centralized control element or function such as a CCU is connected to a corresponding local device or function management control device which is in charge of a predefined location, such as a building or the like in which devices or functions to be controlled are installed. The CCU is connected, for example, to a plurality of such local device or function management control device each being in charge of a predefined location or of a subarea or specific function of the predefined location. For example, a local device or function management control device is in charge of each transport and/or access device or function of the building, i.e. controls each transport and/or access device or function of the building, like elevators, escalators etc. In other words, each location (like a building) manages its own devices semi-independently by means of the local device or function management control device. Hence, all data related to operations to be conducted, such as an update of software being installed in the devices, a changed configuration setting of the devices, etc. are delivered first to the building's own local device or function management control device, which in turn conducts the transaction towards the local devices or functions of this specific location in a local manner after having safely received the data from the CCU.

Hence, the reliability of the connection between the CCU and predefined location (i.e. the local device or function management control device) does not influence the functionality of the devices or functions to be controlled, such as of elevators or the like. All data can be transmitted to the predefined location, and only when the data are delivered completely, further processing towards the devices and functions as such is started (e.g. in the form of an update processing). In this phase, the connection to the cloud (the CCU), such as Internet connectivity, is not relevant anymore, while connections in the predefined location between the local device or function management control device and the respective devices can be made more reliable, e.g. in the form of a wired connection using robust communication protocols.

It is to be noted that a telecommunication connection between the CCU and the local device or function management control device is not mandatory for ensuring that the device management system according to examples of embodiments is working properly. For example, the data indicating the set operations can be delivered to the building (i.e. the local device or function management control device) not only by communication links, such as the Internet, but also in the form of a locally connected data source device, such as a local maintenance tool which is physically connected to an interface of the local device or function management control device. Thus, even if the building has no Internet connectivity at all, it is possible to conduct a management which is identically to those of buildings that are connected to the CCU via Internet, for example. Hence, separate management systems for connected and non-connected buildings can be avoided.

FIG. 1 shows a schematic diagram illustrating a configuration of device management system according to some examples of embodiments. It is to be noted that examples of embodiments are not limited to a device management system with the numbers and types of local device or function management control devices, local devices or functions to be controlled, and the like as shown in FIG. 1. Rather, the numbers and types of such functions and/or devices elevators may be different to that indicated in FIG. 1, i.e. there may be implemented or present more (or less) of the corresponding devices and/or functions than those shown in FIG. 1.

As shown in FIG. 1, the design of the device management system comprises the following parts. A centralized control element or function, such as a central server or a plurality of servers formed e.g. in a cloud environment at the Internet is provided which forms a central control unit CCU 10 for a manufacturer, provider and/or operator of devices or functions to be controlled on predefined locations. The predefined locations are, for example, buildings or other locations/areas for which a common control is intended to be conducted.

The devices or functions 20 to be controlled may comprise a plurality of types of devices, components, functions etc. which can be installed or used in a predefined area. For example, in the case of a building, they are e.g. devices or functions related to the transport of persons to or in the building, like one or more elevators, one or more escalators, also including moving walk devices, ramps etc. Alternatively or additionally, the devices or functions to be controlled comprise one or more devices usable for providing access for a person or other devices, such as vehicles, to the building, such as an automatic or semiautomatic a door, an automatic or semiautomatic access gate and the like. Alternatively or additionally, the devices or functions to be controlled comprise one or more devices or functions usable for informing or guiding a person in the building. For example, such a device or function includes a guidance or signage system (comprising screens, signs etc. to be controlled in the building according to a guiding program), an indoor navigation system (comprising e.g. portable terminal devices or the like), an access control system (allowing or denying access to certain areas or parts of the building), a transport and/or access device control system (comprising e.g. an identity check of persons or the like).

In each predefined location (e.g. building) one or more local device or function management control device 10 is provided (referred to hereinafter as DMS 10). The DMS 10 is connected, for example, directly to the CCU 30 via a communication link, such as an Internet based connection.

Alternatively, an indirect connection to the CCU 30 is provided by means of connecting locally a source terminal device, such as a LMT 40, which can be used for exchanging data between the CCU 30 and the corresponding DMS 10. For example, the LMT comprises a memory such as an optical or magnetic mass storage or a semiconductor memory on which corresponding data can be stored, which are then manually transported to interfaces of the CCU 30 and the DMS 10, or the like.

For each device or function to be controlled, a management agent (or DMA 25) is provided. Each DMA 25 is connected with the DMS 10, e.g. by means of a wired or wireless communication connection installed in the building, and serves for communicating with the DMS 10, i.e. for exchanging data between the device or function to be managed and the DMS 10. For example, a DMA 25 is provided for an elevator device and connects the control unit of the elevator to the DMS 10.

Next, phases of the device management procedure in the system as shown in FIG. 1 are explained.

One phase of the device management procedure is gathering and maintaining inventory information, i.e. information related to the devices and functions 20 to be controlled, at the CCU 30 side. Another phase is to provide and conduct remote commands of any kinds at the side of the devices or functions 20.

Gathering inventory information includes that device or function related data are collected or provided by the devices or functions to be controlled, e.g. by means of corresponding sensors or processor etc., and transmitted from the DMA 25 of the devices or functions 20 to the DMS 10. According to examples of embodiments, each DMA 25 sends the information about the device or function being managed in a predefined format. For example, the information contained in the device or function related data includes indication of software versions, hardware versions, etc. of the devices, e.g. of the elevator device's control unit, all types of identification information, serial numbers etc. of the devices and/or functions to be controlled, configuration version indications, network related information, and the like. Basically, it is possible to provide any available information which may be useful for the management processing in the form of the device or function related data.

The DMS 10 gathers the device or function related data from each DMA 25, i.e. stores the information locally. Then, e.g. via the communication connection or when the LMT 40 is connected, the DMS 10 forwards the gathered data or a preselected part of the data to the CCU 30, e.g. to the cloud. Hence, the CCU 30 can use the data gathered at the devices or functions in a processing, e.g. for deciding management tasks or configuration changes. For example, the manufacturer, operator etc. can obtain the information and hence an up-to-date overview of the status of devices and/or functions to be managed for each location (e.g. building) equipped with them.

A result of the processing of the data is, for example, to generate at the CCU 30 remote commands for the devices and/or functions and to provide them therewith.

As one example, a case is assumed where a reboot of one device is deemed to be required, e.g. since this device has reported a fault. The CCU 30 sends the corresponding reboot command to the corresponding DMS 10 which is in charge of the device to be rebooted. The DMS 10 then dispatches the command to the correct device's DMA 25, which in turn causes the device 20 to run the operation, in this case, to reboot the target device 20.

In this processing, it is to be noted that the process described above may be transparent for the device management system. For example, only the DMA 25 in question has to know what type of device to be rebooted is. That is, all devices may be configured to respond to a standard set of commands, which is defined by a corresponding DMA specification. The CCU 30 has only to identify the type of command (here: reboot) and an indication which device is meant. The DMS 10 sends the command to the correct DMA 25 which can thus cause the processing being commanded.

The above described example concerns a case where a single command (such as reboot) is to be provided to a single device 20. Next, another example is explained where the device management system according to examples of embodiments is used for executing a command or a set of commands for a plurality of devices or functions at the same time. For example, a case is considered where an update process for a group of corresponding devices, such as a group of elevator devices, each of which having multiple subcomponents is conducted. One target to be achieved in this context is to maintain compatibility of the software versions between the devices. According to examples of embodiments, such a processing like an update processing of a plurality of devices is conducted in one transaction, without requiring a reliable or even existing connection to the CCU 30.

Specifically, according to examples of embodiments, the CCU 30 sends a set of commands and required data, such as a set sequential commands for any number of parallel devices (here, an update command for the elevator devices in one building, including the data to be updated for each subcomponent of the elevator devices in question) to the DMS 10 of the building. As indicated above, the delivery of the commands and data can be done via a communication connection or manually via maintenance tools 40.

The DMS 10 runs the sequence of commands, i.e. it sends the commands and data required for the update processing, to each of the DMA 25 belonging to the elevator group to be updated. During this process, the DMS 10 monitors the update processing. That is, the DMS 10 is able to react to any failure at any step of the transaction. For example, when it is determined that in one of the elevator devices to be updated a failure of the update process occurs, which means that the update to the new version is not completed, the DMS 10 reacts to such a failure by restoring all the devices being the target of the update process (i.e. of the current transaction) back to the state before the whole update operation began, even the devices that did seem to update successfully. For this purpose, the "old" data (software version, configuration data etc.) are kept, e.g. stored beforehand, so that the restoring to the previous state can be executed.

By means of this processing, it is possible to avoid a problem when such a transaction, like an updating process, is executed on the basis of a live connection to the CCU 30. In case a failure at one device to be updated occurred, when the connectivity to the CCU 30 is lost during the transaction, the whole system may be in an inoperable state. For example, each of the devices might still work correct, individually, but the system as a whole may be broken.

Another example of embodiments concern a case where the device management system is used for installing or replacing devices, functions or subcomponents in the location. The device management system is informed about all required details of each device, function or subcomponent. This information is useful when commissioning a new equipment and replacing a spare or broken part.

For example, in case a device has broken up permanently and is to be replaced with an identical spare part, as soon as the new device or function is provided with the identity it should resume in the system, all required information (configuration setting, software etc.) can be provided from the DMS 10. Since the DMS 10 knows the current versions and settings to be used at the location for each device and function, it is guaranteed that the correct (i.e. latest) version and setting is provided to the new device or function and installed therein. This provision of data is done automatically, i.e. without the requirement that service personal is involved.

Similarly, as another example, when commissioning a new piece of equipment to a new building, all required details of this device are provided in the DMS 10 even before the physical device exists. Based on the ordered system, all types of devices to be delivered are known, and consequently the data (software, configuration setting) required for each device can be adjusted for the whole system. Then, for commissioning the new device, it is only required to connect a correct type of device and assign it the correct identity, similarly to the case of a spare part. Then, all required data can be forwarded to the devices.

It is to be noted that by means of having similar procedures for replacing spare parts and commissioning new equipment, the complexity of the device management procedure can be reduced, thus reducing costs and processing load.

That is, according to examples of embodiments, it is possible to gain up-to-date information about each device or function to be controlled by means of an automatic process, which allows to avoid the necessity to involve a human service personal in the procedure. Hence, more data being more reliable can be used, so that more efficient maintenance decisions based thereon can be made. Furthermore, processing like of update operations can be executed remotely without the necessity to have a reliable connection to the CCU, for example, so that the necessity for site visits can be avoided.

According to examples of embodiments, the local device or function management control device is able to coordinate local actions even in case of communication connection failures. Furthermore, according to further examples, the local device or function management control device has copy of software and configuration data of all devices installed e.g. in a building, so that it is able to execute restore functions if for example a device software update fails, so that compatibility of the devices is ensured, even if a network connection fails.

Figure 2:
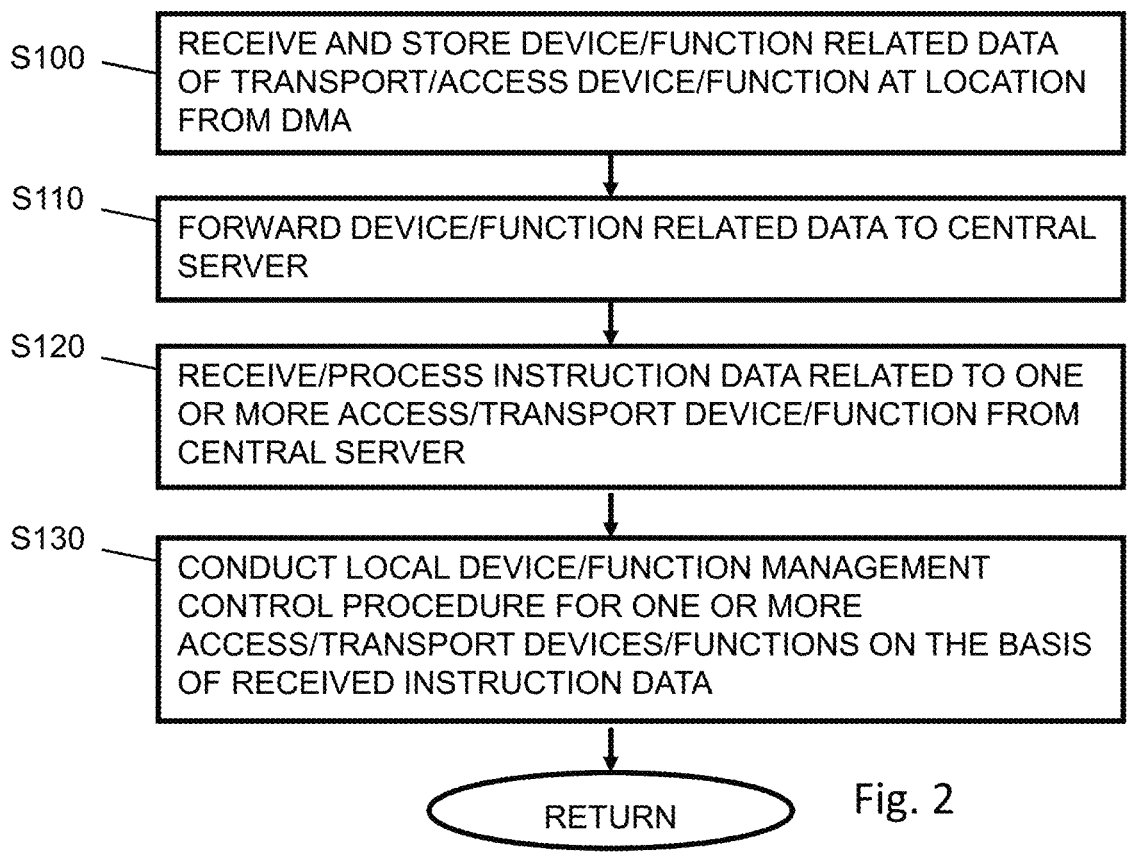
FIG. 2 shows a flow chart of a processing conducted in a local device/function management control device or function according to some examples of embodiments.

FIG. 2 shows a flow chart of a processing conducted in a local device or function management control device of a device management system according to some examples of embodiments. Specifically, the example according to FIG. 2 is related to a procedure conducted by a DMS 10 of FIG. 1.

In S100, the a local device or function management control device 10 receives, from a device management element or function like the DMA 25 of one or more (e.g. each connected and controlled) transport and/or access device or function 20 installed at a predefined location for which a local control is to be conducted, corresponding device or function related data, and stores the device or function related data.

For example, according to some examples of embodiments, the transport and/or access device or function includes one or more of the following examples. One example is a device usable for transporting at least one person. Such a device usable for transporting the at least one person includes, for example, one or more of an elevator device, an escalator device, a moving walk device, a ramp, and the like. Another example is a device usable for providing access for at least one person to the location in question. Such a device usable for providing access for the at least one person includes, for example, an automatic or semiautomatic door device installed in a building representing the predefined location, an automatic or semiautomatic access gate device installed in a building representing the predefined location, and the like. Another example is a device or function usable for informing or guiding at least one person in the predefined location. Such a device or function usable for informing or guiding the at least one person in the predefined location includes, for example, a guidance or signage system, an indoor navigation system, an access control system, a transport and/or access device control system, and the like. It is to be noted that the transport and/or access device or function includes the complete transport and/or access device or function, parts of the transport and/or access device or function, subcomponents of the transport and/or access device or function, and the like.

According to further examples of embodiments, the device or function related data comprises at least one of information indicating a software version of the transport and/or access device or function, information indicating a hardware version of the transport and/or access device or function, identification information of the transport and/or access device or function, configuration setting information of the transport and/or access device or function, and status information of the transport and/or access device or function.

In S110, the device or function related data stored in the local device or function management control device 10 are forwarded to a centralized control element or function, such as the CCU 30.

Then, in S120, the local device or function management control device 10 receives, from the centralized control element or function like the CCU 30, and processes instruction data for the at least one transport and/or access device or function 20. According to examples of embodiments, the instruction data are received from the centralized control element or function by using a signaling link via a communication network, or by locally connecting a maintenance unit, like the LMT 40, and transferring the instruction data from the maintenance unit (for example in case a communication network connection between the DMS 20 and the CCU 30 is not available).

According to examples of embodiments, the instruction data comprises at least one of the following: a command concerning one transport and/or access device or function or a group comprising a plurality of transport and/or access devices or functions installed in the predefined location, for example for devices or functions of the same or similar type (e.g. all elevator devices); a sequence of commands concerning one transport and/or access device or function or a group comprising a plurality of transport and/or access devices or functions installed in the predefined location, for example for devices or functions of the same or similar type (e.g. all elevator devices); configuration data concerning one transport and/or access device or function or a group comprising a plurality of transport and/or access devices or functions installed in the predefined location, for example for devices or functions of the same or similar type (e.g. all elevator devices).

In S130, the local device or function management control device 10 conducts a local device or function management control procedure for the at least one transport and/or access device or function according to a result of the processing of the instruction data.

Figure 4:
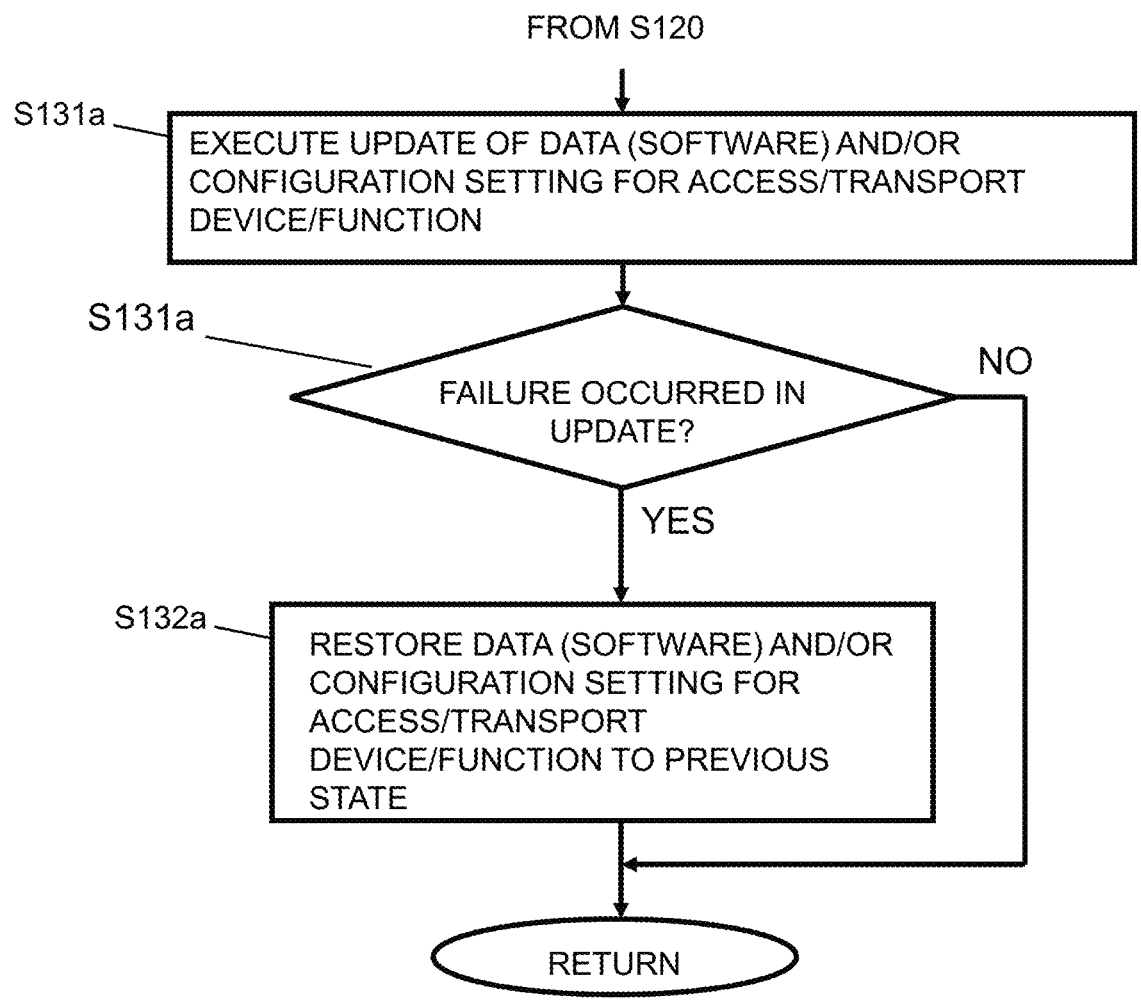
FIG. 4 shows a flow chart of a processing conducted in a local device/function management control device or function according to some examples of embodiments.

For example, according to one example of embodiments which is illustrated in FIG. 4, the local device or function management control procedure for the at least one transport and/or access device or function 20 according to the result of the processing of the instruction data is related to a processing as described below.

Specifically, after S120 is conducted, in S131a, local device or function management control procedure includes to execute an updating process of data installed in or of a configuration setting of the at least one transport and/or access device or function. Then in S132a, it is determined whether a failure in the updating process occurred. If no failure occurred, the processing ends. Otherwise, in case a failure is determined in S132a, S133a is conducted in which the data and/or the configuration setting is restored into a previous state, i.e. a state before executing the updating process in S131a.

Figure 5:
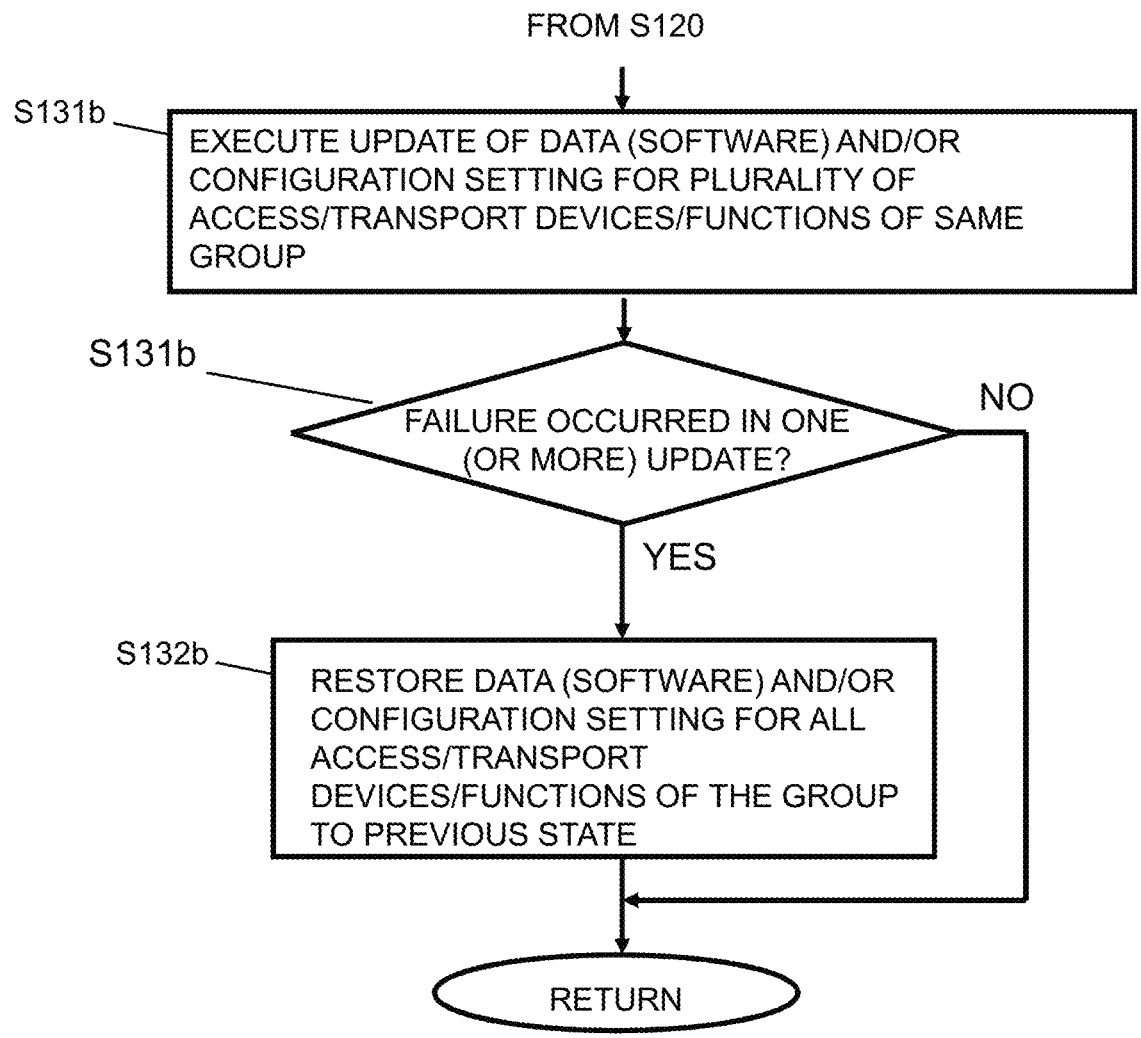
FIG. 5 shows a flow chart of a processing conducted in a local device/function management control device or function according to some examples of embodiments.

Alternatively or additionally, according to some examples of embodiments, as illustrated in FIG. 5, the local device management control procedure for the at least one transport and/or access device or function 20 according to the result of the processing of the instruction data is related to a processing as described below.

In S131b, after S120 is conducted, an updating process of data installed in or of a configuration setting of a plurality of transport and/or access devices or functions being allocated to one group is executed. Then, in S132b, it is determined whether a failure in the updating process occurred in at least one of the plurality of transport and/or access devices or functions being allocated to the one group. If no failure occurred, the processing ends. Otherwise, in case a failure is determined, the data or the configuration setting is restored into a previous state, i.e. the state before executing the updating process in S131b, for each of the plurality of transport and/or access devices or functions allocated to the one group.

Figure 6:
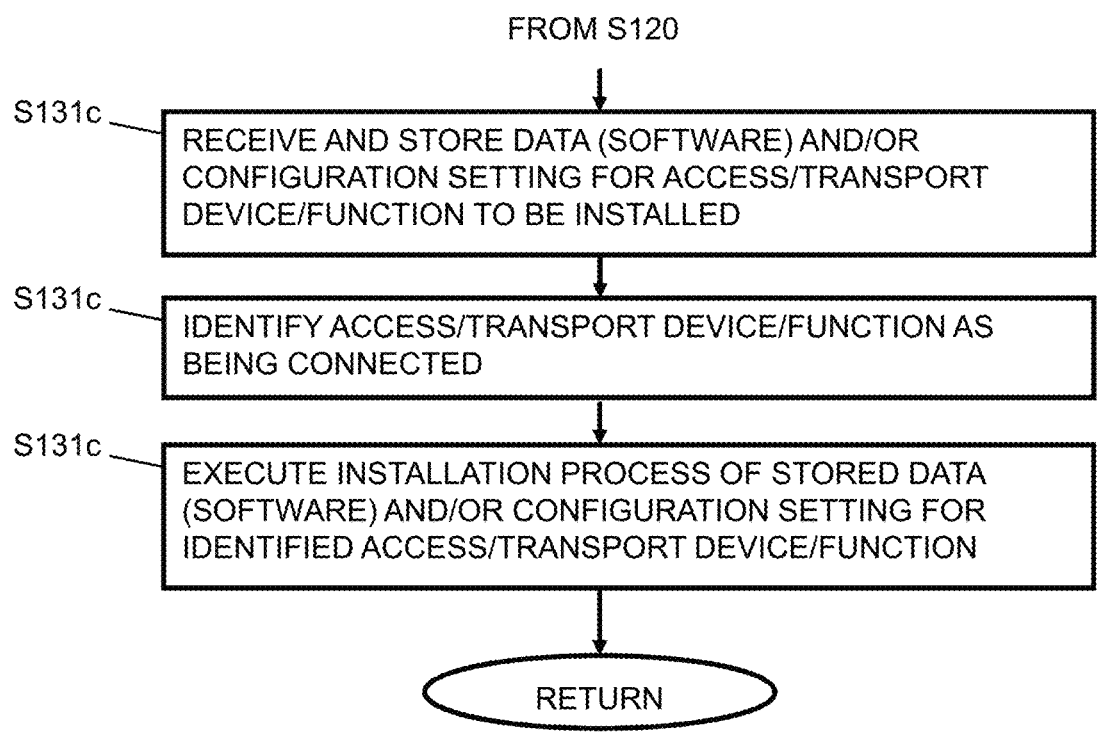
FIG. 6 shows a flow chart of a processing conducted in a local device/function management control device or function according to some examples of embodiments.

Alternatively or additionally, according to some examples of embodiments, as illustrated in FIG. 6, the local device or function management control procedure for the at least one transport and/or access device or function 20 according to the result of the processing of the instruction data is related to the following processing.

Specifically, in S131c, at least one of data to be installed in and a configuration setting of at least one transport and/or access device or function is received and stored. Then, in S132c, the at least one transport and/or access device or function it is identified as being connected. In S133c, executing an installation process of at least one of the data to be installed in and the configuration setting of the identified transport and/or access device or function is executed.

Figure 3:
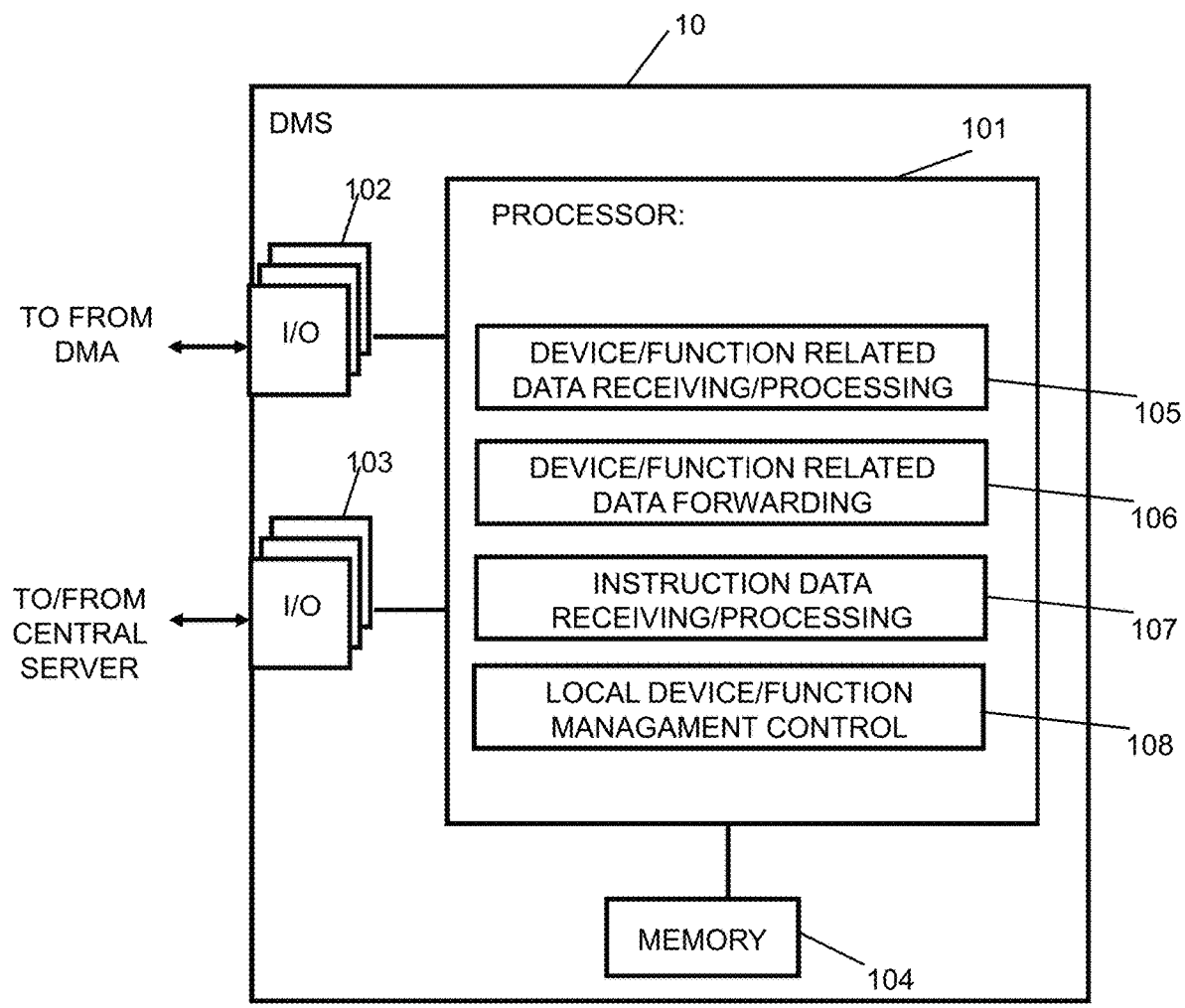
FIG. 3 shows a diagram of a configuration of a local device/function management control device according to some examples of embodiments.

FIG. 3 shows a diagram of a configuration of a local device or function management control device, such as of the DMS 10 according to some examples of embodiments, which is configured to implement a procedure for managing devices and/or functions at a predetermined location as described in connection with some of the examples of embodiments. It is to be noted that the local device or function management control device, which comprises a function of the DMS 10 of FIG. 1, may include further elements or functions besides those described herein below. Furthermore, even though reference is made to a device like a controller, the device or function may be also another device or function having a similar task, such as a chipset, a chip, a module, an application etc., which can also be part of a controller or attached as a separate device to a controller, or the like. It should be understood that each block and any combination thereof may be implemented by various means or their combinations, such as hardware, software, firmware, one or more processors and/or circuitry.

The local device or function management control device 10 shown in FIG. 3 may include a processing circuitry, a processing function, a control unit or a processor 101, such as a CPU or the like, which is suitable for executing instructions given by programs or the like related to the control procedure. The processor 101 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 102 and 103 denote input/output (I/O) units or functions (interfaces) connected to the processor or processing function 101. The I/O units 102 may be used for communicating with elements or function such as the DMA 20 (i.e. the respective devices or functions being controlled, like elevators etc.), as described in connection with FIG. 1, for example. The I/O units 103 may be used for communicating with a centralized control element or function such as the CCU 30, as described in connection with FIG. 2, for example. The I/O units 102 and 103 may be a combined unit including interface or communication equipment towards several elements, or may include a distributed structure with a plurality of different interfaces for different elements. Reference sign 104 denotes a memory usable, for example, for storing data and programs to be executed by the processor or processing function 101 and/or as a working storage of the processor or processing function 101. It is to be noted that the memory 104 may be implemented by using one or more memory portions of the same or different type of memory.

The processor or processing function 101 is configured to execute the local device or function management control processing related to the above described procedures. In particular, the processor or processing circuitry or function 101 includes one or more of the following sub-portions. Sub-portion 105 is a processing portion which is usable as a portion for receiving and processing the device/function related data. The portion 105 may be configured to perform processing according to S100 of FIG. 2. Furthermore, the processor or processing circuitry or function 101 may include a sub-portion 106 usable as a portion for forwarding the stored device/function related data. The portion 106 may be configured to perform a processing according to S110 of FIG. 2. In addition, the processor or processing circuitry or function 101 may include a sub-portion 107 usable as a portion for receiving and processing instruction data. The portion 107 may be configured to perform a processing according to S120 of FIG. 2. Moreover, the processor or processing circuitry or function 101 may include a sub-portion 108 usable as a portion for conducting a local device/function management control. The portion 108 may be configured to perform a processing according to S130 of FIG. 2.

In addition, according to another example of embodiments, there is provided an apparatus comprising at least one processing circuitry, and at least one memory for storing instructions to be executed by the processing circuitry, wherein the at least one memory and the instructions are configured to, with the at least one processing circuitry, cause the apparatus at least: to receive, from a device management element or function of at least one transport and/or access device or function installed at a predefined location for which a local control is to be conducted, and storing device or function related data, to forward the stored device or function related data to a centralized control element or function, to receive, from the centralized control element or function, and to process instruction data for the at least one transport and/or access device or function, and to conduct a local device or function management control procedure for the at least one transport and/or access device or function according to a result of the processing of the instruction data.

Furthermore, according to some other examples of embodiments, in the above apparatus may comprise means configured to conduct at least one of the processing defined in the above described methods, for example a method according that described in connection with FIG. 2.

Moreover, according to examples of embodiments, a method, device and system may be provided which are configured to execute the following processing. A local device management control procedure is conducted for a plurality of transport and/or access devices installed at a predefined location for which a local control is to be conducted. Data and/or configuration setting information to be used for updating at least one group of the plurality of transport and/or access devices are received and processed. Data and configuration setting information reflecting a state of the at least one group of the plurality of transport and/or access devices to be updated before executing an update process are stored. Then, an updating process of the at least one group of the plurality of transport and/or access devices on the basis of the received data and/or configuration setting information is executed. It is determined whether a failure in the updating process has occurred in at least one transport and/or access device. If this is the case, i.e. a failure is determined, the data and/or the configuration setting are restored into a state before executing the updating process for the each transport and/or access device of the at least one group of the plurality of transport and/or access devices on the basis of the stored data and configuration setting information reflecting the state before executing an update process.

It should be appreciated that embodiments suitable to be implemented as software code or portions of it and being run using a processor or processing function are software code independent and can be specified using any known or future developed programming language, such as a high-level programming language, such as objective-C, C, C++, C #, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, a device may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. A method of operating a local management control device configured to communicate via a first network connection with at least one transport and/or access device installed at a location for which a local control is to be conducted, and to communicate via a second network connection with a centralized controller outside of the location, comprising:
   receiving device data from the at least one transport and/or access device;
   storing the device data;
   forwarding the stored device data to the centralized controller;
   receiving, from the centralized controller, instruction data for the at least one transport and/or access device in response to the forwarding of the stored device data; and
   conducting a local management control procedure for the at least one transport and/or access device based on the instruction data, the local management control procedure including,
      transmitting, via the first network connection, an instruction to the at least one transport and/or access device to execute an updating process of updating the device data installed on the at least one transport and/or access device using the instruction data received by the local management control device from the centralized controller,
      determining whether a failure in the updating process occurred, and
      restoring the device data into a state before executing the updating process, if the determining determines that the failure in the updating process occurred.

2. The method according to claim 1, wherein
the at least one transport and/or access device includes at least one of,
   a transport device including an elevator device, an escalator device, a moving walk device, or a ramp, and
   an access device including an electronic door or an access gate device; and wherein the device data comprises at least one of information indicating a software version, a hardware version, identification information, configuration setting information, and status information of the transport and/or access device.

3. The method according to claim 1, wherein
the instruction data are received from the centralized controller via a communication network, or by locally connecting a maintenance terminal.

4. The method according to claim 1, wherein the instruction data comprises at least one of
   a command concerning one transport and/or access device or a group of a plurality of transport and/or access devices,
   a sequence of commands concerning the one transport and/or access device or the group of the plurality of transport and/or access devices, and
   configuration data concerning the one transport and/or access device or the group of the plurality of transport and/or access devices.

5. The method according to claim 1, wherein executing the updating process includes
   executing the updating process of a plurality of transport and/or access devices allocated to as a group of transport and/or access devices,
   determining whether the failure in the updating process occurred in at least one of the plurality of transport and/or access devices allocated to the group of transport and/or access devices, and
   restoring, for the each of the plurality of transport and/or access devices allocated to the group of transport and/or access devices, the device data into the state before executing the updating process, if the determining determines that the failure in the updating process occurred in the at least one of the plurality of transport and/or access devices.

6. The method according to claim 1, wherein the local management control procedure further includes,
   determining whether the at least one transport and/or access device is offline,
   storing the instruction data, in response to determining that the at least one transport and/or access device is offline,
   identifying the at least one transport and/or access device as being connected, and
   executing an installation process of installing the instruction data in the identified transport and/or access device.

7. A non-transitory computer readable medium storing a computer program product that when executed by a computer, configures the computer to perform the steps of claim 1.

8. The method of claim 1, wherein the centralized controller is indirectly connected to the at least one transport and/or access device in a star-of-stars topology with the centralized controller connected to the local management control device and the local management control device connected to the at least one transport and/or access device.

9. The method of claim 1, wherein the local management control device is configured to store the state of the device data prior to executing the updating process as backup device data such that the backup device data is restorable upon the failure in the updating process.

10. The method of claim 9, wherein the restoring the device data includes providing, via the first network connection, the at least one transport and/or access device with the backup device data stored at the local management control device.

11. The method of claim 1, wherein the transmitting the instruction comprises:
    delaying transmitting the instruction to the at least one transport and/or access device via the first network connection until at least completion of receipt of the instruction data from the centralized controller via the second network connection.

12. A local management control device configured to communicate via a first network connection with at least one transport and/or access device installed at a location for which a local control is to be conducted, and to communicate via a second network connection with a centralized controller outside of the location, the local management control device comprising:
    an input/output device configured to exchange, over the first network connection, device data with the at least one transport and/or access device;
    a memory configured to store the device data; and
    processing circuitry configured to,
        forward the stored device data to the centralized controller,
        receive, from centralized controller, instruction data for the at least one transport and/or access device in response to the forwarding of the stored device data, and
        conduct a local management control procedure for the at least one transport and/or access device based on the instruction data, the local management control procedure including,
            transmitting, via the first network connection, an instruction to the at least one transport and/or access device to execute an updating process of updating the device data installed on the at least one transport and/or access device using the instruction data received by the local management control device from the centralized controller,
            determining whether a failure in the updating process occurred, and
            restoring the device data into a state before executing the updating process, if the determining determines that the failure in the updating process occurred.

13. A system for conducting a management control, the system comprising:
    at least one transport and/or access device installed at a location for which a local control is to be conducted;
    a centralized controller outside of the location, and
    at least one local management control device configured to communicate via a first network connection with the at least one transport and/or access device, and to communicate via a second network connection with the centralized controller,
    wherein the at least one local management control device is configured to,
        receive device data from the at least one transport and/or access device,
        store the device data,
        forward the stored device data to the centralized controller,
        receive, from the centralized controller, instruction data for the at least one transport and/or access device; and
        conduct a local management control procedure for the at least one transport and/or access device based on the instruction data, the local management control procedure including,
            transmitting, via the first network connection, an instruction to the at least one transport and/or access device to execute an updating process of updating the device data installed on the at least one transport and/or access device using the instruction data received by the local management control device from the centralized controller,
            determining whether a failure in the updating process occurred, and
            restoring the device data into a state before executing the updating process, if the determining determines that the failure in the updating process occurred.

* * * * *